(12) United States Patent
Schlösser et al.

(10) Patent No.: US 6,460,480 B1
(45) Date of Patent: Oct. 8, 2002

(54) LABEL FOR PLANTS WHICH CAN BE INSERTED INTO THE SOIL

(76) Inventors: Ulrich Schlösser, Lindenstrasse 2, D-74397 Pfaffenhofen (DE); Lothar Dedden, Birkenfelder Strasse 18, D-26160 Bad Zwischenahn (DE); Daniel Boxser, 79 Abingdon Villas, London W8 6XB (GB)

( * ) Notice: Subject to any disclaimer, the term of this patent is extended or adjusted under 35 U.S.C. 154(b) by 0 days.

(21) Appl. No.: 09/601,112
(22) PCT Filed: Jan. 28, 1999
(86) PCT No.: PCT/DE99/00222
§ 371 (c)(1), (2), (4) Date: Aug. 29, 2000
(87) PCT Pub. No.: WO99/38371
PCT Pub. Date: Aug. 5, 1999

(30) Foreign Application Priority Data

Jan. 30, 1998 (DE) .................................. 298 01 385 U

(51) Int. Cl.⁷ .............................................. G01N 5/02
(52) U.S. Cl. ........................................ 116/206; 73/73
(58) Field of Search ............................ 73/73; 116/206, 116/204, 200

(56) References Cited

U.S. PATENT DOCUMENTS

| | | | | |
|---|---|---|---|---|
| 2,249,867 A | * | 7/1941 | Snelling | 116/206 |
| 3,117,442 A | * | 1/1964 | Brooks | 116/200 |
| 3,702,755 A | * | 11/1972 | Palmer | 116/206 |
| 3,759,261 A | * | 9/1973 | Wang | 116/200 |
| 3,824,844 A | * | 7/1974 | Strickland | 73/73 |
| 3,881,873 A | * | 5/1975 | Klowden | 116/206 |
| 3,951,098 A | | 4/1976 | Meyers | 116/114 AM |
| 4,130,012 A | | 12/1978 | Lockerby et al. | 73/73 |
| 4,150,570 A | * | 4/1979 | Fuller | 73/335 |
| 4,184,445 A | | 1/1980 | Burrows | 116/206 |
| 4,382,380 A | * | 5/1983 | Martin | 73/73 |
| 4,743,121 A | * | 5/1988 | Takagi et al. | 374/163 |
| 5,438,796 A | | 8/1995 | Nathan | 47/66 |
| 5,694,806 A | * | 12/1997 | Martin et al. | 73/73 |

FOREIGN PATENT DOCUMENTS

| | | | |
|---|---|---|---|
| DE | 298 01 385 U | 3/1998 | |
| EP | 0 215 600 A | 3/1987 | |
| EP | 0 476 948 A | 3/1992 | |
| GB | 2 059 077 A | 4/1981 | |
| JP | 07055788 A | * 3/1995 | G01N/31/00 |
| WO | WO98/23920 | * 11/1997 | |

* cited by examiner

Primary Examiner—Diego Gutierrez
Assistant Examiner—Gail Verbitsky
(74) Attorney, Agent, or Firm—Banner & Witcoff, Ltd.

(57) ABSTRACT

A marker (10) for identifying plants, which is designed for inserting into soil (16), is designed in such a way that it absorbs moisture. (FIG. 1).

7 Claims, 1 Drawing Sheet

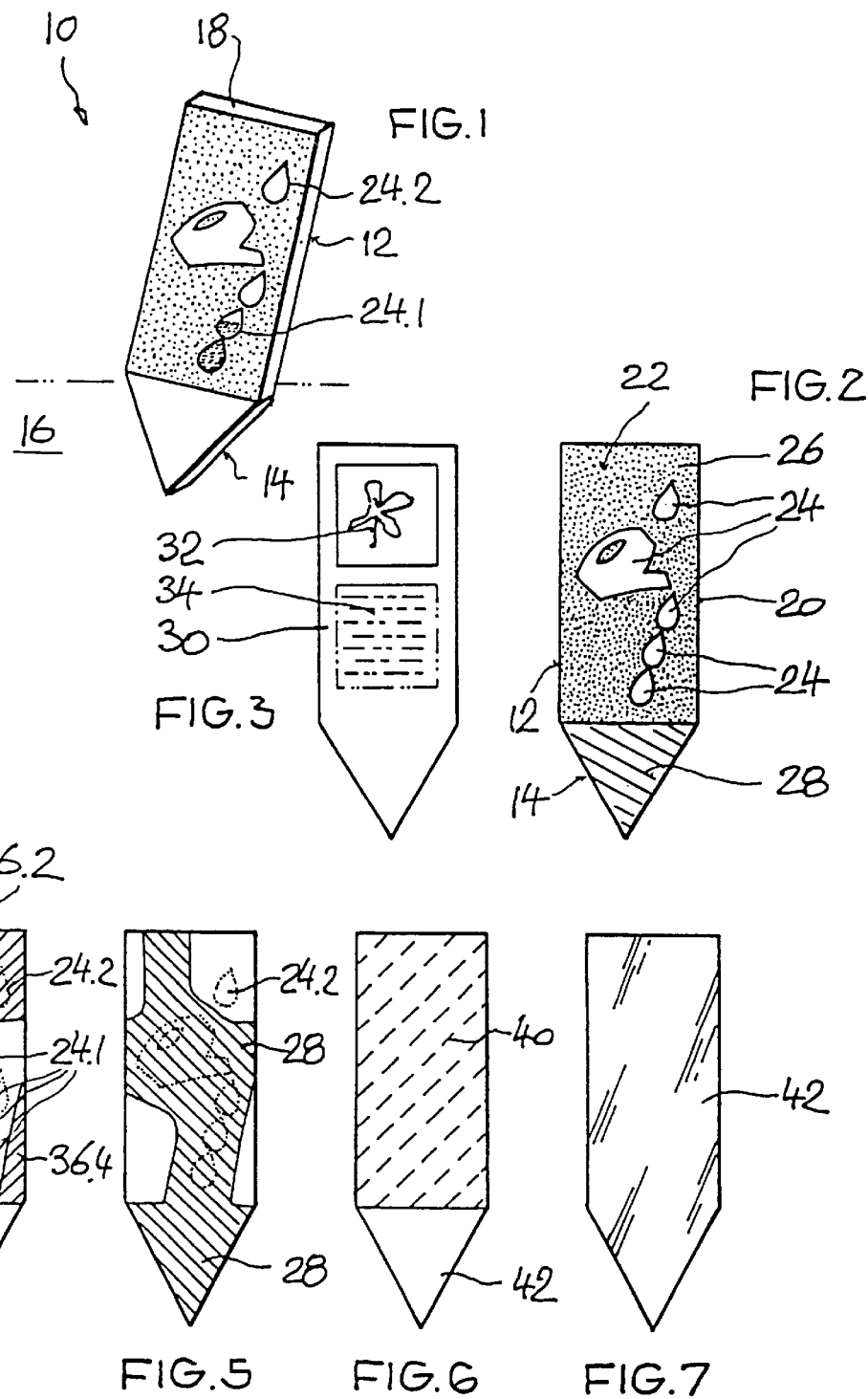

LABEL FOR PLANTS WHICH CAN BE INSERTED INTO THE SOIL

TECHNICAL FIELD

The invention relates to a marker for identifying plants which is designed for inserting into soil. Markers of this type can be inserted into flower pots, beds or other soil in order to provide an indication of plants planted in the soil.

PRIOR ART

Known markers are produced from a sheet-like material. Their one end is pointed, as a result of which the marker can easily be pushed into soil. On one or both flat viewing sides of the marker, textual and often also pictorial explanations of plants, shrubs and the like are applied. In addition, measuring strips in the form of moisture sensors which can likewise be inserted into soil are known. These moisture sensors can absorb moisture from the soil and indicate by a resultant greater or lesser coloration the moisture content of the soil.

SUMMARY OF THE INVENTION

Starting out from this previously known prior art, the invention is based on the object of specifying an improved marker of the type stated at the beginning.

The marker according to the invention for identifying plants is accordingly distinguished in that it is also designed in such a way that it absorbs moisture. With a marker of this type, on the one hand indications of plants or a plant and on the other hand at the same time also the moisture present in the soil into which the marker has been inserted can be perceived. The invention is based on the realization that textual and pictorial identifications for plants can find adequate space on one viewing side of a marker and that the other viewing side, for example the rear side of the marker, can then be used for the moisture indication. Although the knowledge of characteristic data of certain plants and of the moisture content of the soil in which the plant concerned is to be placed are among the basic questions in horticulture, it is surprising that until now no one has come up with the idea of providing the answer to these two questions by a single marker.

As a moisture-absorbing material, calcium hydroxide has been found to be an inexpensive and functionally fully capable material.

Essential embodiments of the marker according to the invention are specified in terms of their features in the subclaims. Further advantages of the invention can be taken from the subclaims and the exemplary embodiment represented in the drawing.

BRIEF DESCRIPTION OF THE DRAWING

The invention is described and explained in more detail below on the basis of the exemplary embodiment represented in the drawing, in which:

FIG. 1 shows a view of a marker according to the invention inserted into soil,

FIG. 2 shows the rear side of the label according to FIG. 1 with an outer covering layer which has transparent regions, FIG. 3 shows the front side of the marker according to FIG. 1, FIG. 4 shows a view similar to FIG. 2, with a representation of the applications of adhesive shown shaded beneath the covering layer, FIG. 5 shows a representation similar to FIG. 2, with calcium hydroxide regions present between the applications of glue, FIG. 6 shows a representation similar to FIG. 2, with a layer of ink present beneath the adhesive and calcium hydroxide regions, FIG. 7 shows a representation similar to FIG. 2, with a base plate visible beneath the layer of ink according to FIG. 6.

WAYS OF CARRYING OUT THE INVENTION

A marker 10 comprises in the case of the present example a flat material of plastic. The marker 10 has an upper body portion 12 which is rectangular when viewed in elevation and onto which there is integrally formed a further body portion 14, tapering 15 to a point. The tapered design of this body portion 14 allows the marker 10 to be easily inserted from above into an area of soil 16. The thickness 18 of the marker 10 is very small in comparison with the extents of the sheet-like areas, which are represented in outline in FIGS. 2 et seq.

Shown in FIG. 2 is the rear side 20 of the marker 10. In the region of the body portion 12, this rear side is covered from outside with a covering film 22. In the case of the present example, this film 22 is coloured dark green, which is represented in FIG. 2 by dots. Cut out in these dark regions are light transparent regions 24. As a result, these regions 24 are visually set apart well from the remaining region 26 surrounding them in dark green.

In the region of the body portion 12 there can be seen a layer of lime (layer of calcium hydroxide) 28, as will be described in more detail in conjunction with FIG. 5.

On the front side 30 lying opposite the rear side 20 (FIG. 3) of the marker 10 there can be seen printed on in the upper region of the same a pictorial representation 32 and a textual component part 34, which both give explanations concerning the plant identified by the marker 10.

Present beneath the covering film 22 in four outer corner regions 36.1, 36.2, 36.3 and 36.4 there is in each case a layer of glue 38. The covering film 22 is held on the marker 10 by these layers of glue. In the upper right-hand region 36.2 in the drawing, a light transparent region 24.2 in the form of dots can be seen. This transparent region 24.2 consequently lies on the layer of glue 38. The other light transparent regions, which comprise three drops 24.1 arranged one above the other and a watering can 24.3 arranged symbolically above that, are not located in the glue regions 36.1, 36.2, 36.3 or 36.4. Instead of the drops and the watering can, other shapes can also be present. However, the drops and watering can clearly indicate the function of the marker as a moisture indicator.

The transparent regions 24.1 and 24.3 are located between the adhesive regions 36 in a contiguous region 28, which is a layer of lime. This layer of lime extends into the lower pointed region 12 of the marker 10.

Present beneath the layer of adhesive 38 and the layer of lime 28 is a dark layer of ink 40, green in the case of the present example. This dark layer of ink is present in the region of the body portion 12.

The layer of ink 40 has been applied to a base plate 42 consisting of plastic or some other waterproof material. The base plate 42 represents the flat material, for example, from which the marker 10 is produced. On the other viewing surface, not visible in FIG. 7, of the base plate 42, the pictorial and textual component parts 32, 34 according to FIG. 3 can be seen.

The marker 10 works in the following way.

By insertion in an area of soil 16, moisture penetrates into the region of the layer of lime 28 and rises into the region of the body portion 12. The moisture causes the lime to become transparent, so that then the dark, green layer of ink 40 beneath it can be seen. The light transparent regions 24.1 and 24.3 [sic] visibly turn green, correspondingly, as moisture from the region of the pointed body portion 12 penetrates upward into the body portion 12 and makes the layer of lime 28 translucent. In FIG. 1, the moisture has penetrated into the middle of the three drop-shaped transparent regions 24.1. As a result, the lower and middle regions of these three regions 24.1 have "turned" green. The green appearance of these originally light transparent regions 24.1 is caused by the green layer of ink 40 (FIG. 6), which has become visible through the moist layer of lime 28 that has become translucent.

The darkening of the originally light transparent regions 24 is thus a sign as to how much the moisture has risen in the marker 10. The more originally light transparent regions 24 have darkened, the higher the moisture has risen into the marker and the greater the moisture is in the soil 16.

The light transparent region 24.2, which has been placed in the region of the layer of lime 38 (FIG. 4), cannot become coloured. Beneath this transparent region 24.2 there is no layer of lime (FIG. 5) which could "become coloured" by being transparent due to moisture. The dark layer of ink 40 also present beneath this transparent region 24.2 therefore remains invisible in this transparent region 24.2.

As soon as the moisture escapes from the marker, for example by evaporation and/or drying out of the soil 16 into which the marker has been inserted, the layer of lime 28 becomes light again and visually opaque. The layer of ink 40 can then no longer be visually perceived. The light transparent regions 24 are consequently present again as light regions. The marker 10 again appears to a viewer as it is represented in FIG. 2.

What is claimed is:

1. A marker (10) for identifying plants, which is designed for inserting into soil (16), comprising:
   a layer strip of moisture-absorbing material (28) on a first surface region (20) of the marker;
   a second surface region (30) which is provided with pictorial or textual indications (32, 34) for the plants to be identified by the marker;

wherein the marker further comprises layers superimposed in the following order:
   a first base layer of plastic (42);
   a second dark layer of ink (40) which is present on at least a subregion of an upper body portion (12) of first surface region (20);
   a third layer, which comprises:
      the layer strip of moisture-absorbing material (28) having at least one edge, which is present on at least the subregion of the upper body portion (12) and a lower body portion (14), and covering at least a portion of the subregion, and
      regions (36.1, 36.2, 36.3, 36.4) having a layer of glue (38) which are present at least in one portion of the third layer where the layer of moisture-absorbing material (28) is not present; and
   a fourth covering layer (22), which covers at least the layer strip of moisture-absorbing material (28), and having transparent regions (24);
wherein a first transparent region (24.1) partially covers the layer strip of moisture-absorbing material (28), and a second transparent region (24.2) covers a region (36.2) of the layer of glue (38), and wherein the regions (36.1, 36.2, 36.3, 36.4) having the layer of glue (38) do not filly enclose the layer strip of moisture-absorbing material (28) at the edge, so that the layer strip of moisture-absorbing material (28) is partially open at the edge.

2. The marker according to claim 1, wherein the moisture-absorbing material comprises calcium hydroxide (28).

3. The marker according to claim 1, wherein the base layer is a plastic plate (42).

4. The marker according to claim 1, wherein the covering layer is a plastic film (22).

5. The marker according to claim 1, wherein the dark layer of ink (40) is green.

6. The marker according to claim 1, wherein the covering layer (22) is light-colored in its transparent regions (24) and dark-colored in other regions.

7. The marker according to claim 1, wherein the layer strip (28) of moisture-absorbing material has the same layer thickness as the regions (36.1, 36.2, 36.3, 36.4) with the layer of glue (38).

* * * * *